United States Patent Office 2,885,354
Patented May 5, 1959

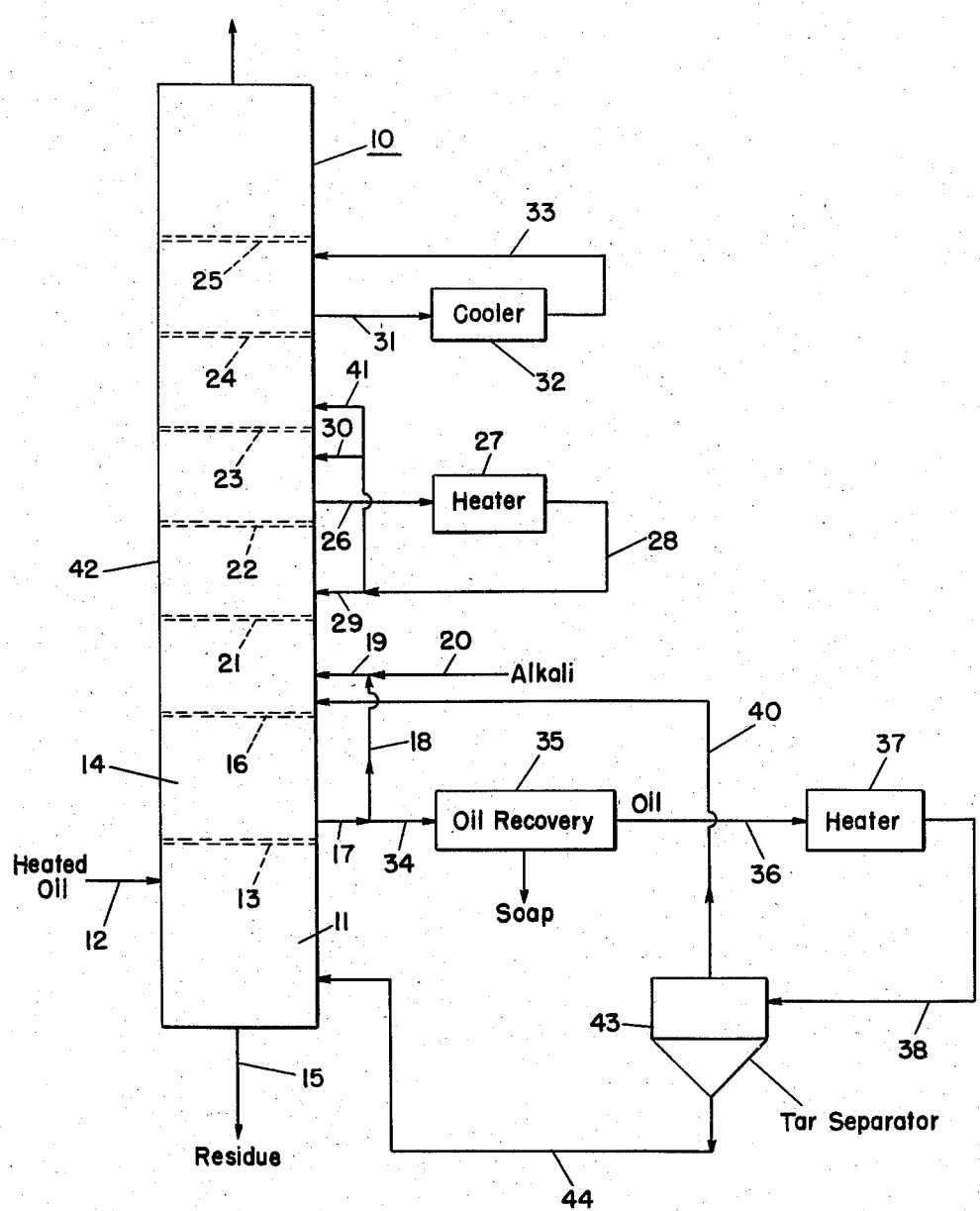

2,885,354

DISTILLATION OF PETROLEUM HYDROCARBONS

Hugh L. Myers, Springfield, Pa., assignor to Sun Oil Company, Philadelphia, Pa., a corporation of New Jersey Application December 30, 1954, Serial No. 478,769

5 Claims. (Cl. 208—284)

This invention relates to distillation, and in one embodiment to distillation involving contact of petroleum vapors with an alkaline treating agent to remove acidic constituents therefrom.

In distillation processes carried out in fractionating columns, it not infrequently occurs that one or more of the plates in the column tends to have insufficient flow of liquid thereover for efficient fractionation. When this occurs, a difficult problem is presented. The condition on the plate in question can usually be corrected by changing the conditions in the distillation, but such change will often adversely affect other parts of the system. The present invention provides an advantageous manner of overcoming a problem of insufficient liquid loading on a plate or plates without adversely affecting other parts of the system.

In one embodiment, the process of the invention involves the vaporization of a distillation charge, passing the evolved vapors through a fractionating column, heating at least part, preferably at least half, of the condensate removed from a plate therein, re-introducing at least half of the heated condensate into the column and removing heat from the column at a level above the level of such introducing. The effects of such introducing are to increase the vapor loading between the level of such introducing and the level of heat removal, and to increase the liquid loading between the level of heat removal and the level of the plate from which the condensate was removed.

The heating of the condensate results in at least partial vaporization thereof. All of the heated condensate, including unvaporized material, if any, can be returned to the column. Alternatively, a portion of the heated condensate, which portion is at least 50 weight percent of the heated condensate, and preferably at least 75 weight percent thereof, is returned to the column. In the latter case, the portion returned usually contains all of the vapor produced by the heating. Preferably, the portion of the heated condensate which is returned to the column is at least 50 percent, more preferably at least 75 percent, of the condensate removed from the plate in question.

The present invention provides an increase in liquid loading on the plates above and including the plate from which condensate was removed, since vapors which would not rise that high in conventional operation, rise sufficiently high in the column to be condensed on those plates, thus providing an increased amount of condensate thereon over that obtained in conventional operation, and thus increasing the liquid loading.

The invention may advantageously be applied to a distillation process which involves contact of petroleum vapors with an alkaline treating agent to remove acidic constituents therefrom. In such application, the process may be used for example to increase the liquid loading on a plate in a lower portion of the fractionating section above the treating section, as more fully described subsequently with reference to the drawing. This can be accomplished for example by introducing, onto a lower plate in the fractionating section, a condensate removed from a higher plate, or a condensate recovered from the alkaline material used in the treating section.

The drawing is a schematic illustration of a fractionating column and associated apparatus for carrying out one embodiment of the process according to the invention.

A distillation charge, e.g. reduced crude petroleum, preheated by means not shown to a suitable temperature, e.g. about 700° F., is introduced through line 12 into flash section 11 of distillation and treating tower 10. The pressure in the flash section may be for example 75 mm. of Hg absolute. Vapors are flashed from the charge and pass upwardly through plate 13, which is suitably apertured for such passage, into treating section 14. Unvaporized material may pass downwardly through a stripping section not shown, and residue is removed from tower 10 through line 15. A liquid alkaline treating agent is passed downwardly from uppermost plate 16 of treating section 14 through intermediate plates, if any, not shown, and onto lowermost plate 13 of treating section 14, and is then removed from plate 13 and returned through lines 17, 18 and 19 to plate 16. The treating agent generally contains an alkali such as sodium hydroxide, alkali soaps of acidic materials originally contained in the charge and removed from the vapors by reaction with the alkali, and liquid hydrocarbon oil condensed from the vapors as the latter pass through treating section 14. Make-up sodium hydroxide is added as needed, for example as 50° Bé. caustic soda, by introduction through line 20.

Vapors pass from plate 13 through the intermediate plates, if any, and plate 16 of the treating section, and come in contact with the liquid alkaline material on the plates. Vapors then pass from plate 16 through the lowermost plate 21 of the fractionating section 42. Plate 21 may advantageously be a total trap-out tray, condensate being removed therefrom through means not shown. Vapors pass from plate 21 through the plates 22, 23, 24, 25 and others if any, of the fractionating section 42. Pools of condensate are maintained on each of the plates 21, 22, 23, 24, 25 etc., and condensate overflows from plate 25 onto plate 24, from plate 24 onto plate 23, etc., through conventional downcomers not shown. Part of the condensate on plate 22, instead of going through the downcomer to plate 21, is removed through line 26, heated in heater 27, and introduced through lines 28 and 29 onto plate 21. Part of the condensate on plate 24, instead of going through the downcomer to plate 23, is removed through line 31, cooled in cooler 32, and returned through line 33 to plate 24.

The amounts of heat removed in cooler 32 and of heat added in heater 27 can be so regulated that the net effect is to increase the vapor loading in the tower between plate 21 and plate 24 and to increase the liquid loading on plates 24, 23 and 22 without appreciably affecting the vapor or liquid loading in any other part of the system. The removal of heat in cooler 32 causes the additional vapor produced as a result of the heating in heater 27 to be converted into increased liquid reflux between plate 24 and plate 22.

Instead of introducing the heated condensate from line 28 through line 29 onto plate 21, that condensate can be introduced through line 30 onto plate 22. In this case, a net effect of increasing the vapor loading between plate 22 and plate 24 and of increasing the liquid loading on plates 24, 23 and 22 can be obtained without appreciably affecting the vapor or liquid loading in any other part of the system. It is noted that the increased liquid run-back extends down to the plate from which the heated condensate was removed regardless of where the heated condensate is introduced in the fractionating column.

The heated condensate can also be introduced through line 41 onto plate 23, in which case the vapor loading between plate 23 and 24 and the liquid loading on plates 24, 23 and 22 can be increased without appreciably affecting the vapor or liquid loading in any other part of the system.

If the cooling in cooler 32 were effected without performing the heating in heater 27, the liquid loading on the plates below plate 25 would be increased, but this increase would be obtained at the expense of reducing the yield of distillates obtained at levels above plate 25, whereas the method of the invention permits the liquid loading on plates 24, 23 and 22 for example to be increased without adversely affecting any other part of the column.

The increased vapor loading as a result of the introduction of the heated distillate extends upwardly from the level of introduction to the level at which sufficient heat has been removed from the column to counteract the addition of heat to the distillate. Preferably the distance between these two levels is not great, since increased vapor loading is not generally advantageous. If insufficient heat is removed at higher levels, the increased vapor loading extends to the top of the column.

The increased liquid loading resulting from introduction of the heated distillate and removal of heat extends downwardly, from the level at which sufficient heat has been removed from the column to counteract the addition of heat to the distillate, to the level at which the condensate corresponds in composition to the introduced distillate. In the case where the introduced distillate was obtained by heating condensate removed from a plate, the level of the latter plate is of course the level at which the condensate corresponds in composition to the introduced distillate.

The increased liquid loading does not extend below the level indicated in the preceding paragraph. Thus, for example, if condensate were removed from plate 23, heated, and introduced onto plate 21, no appreciable increase in liquid loading on plate 21 or plate 22 would result.

Concurrently with, or alternatively to, introduction of heated condensate through line 29 or line 30 or line 41, oil recovered from the alkaline material in the treating section can be heated until its heat content is greater than that of such oil prior to withdrawal from the column; the heated oil can then be introduced above plate 16, for example, as shown, or below plate 16. Thus a drag stream from the circulating alkaline material can be withdrawn through line 34 into oil recovery zone 35. Therein a suitable solvent extraction process, as well known in the art, for separation of hydrocarbon oil from alkali and soap, is performed; and the recovered oil, after separation from solvent, by means not shown, is introduced through line 36 into heater 37, wherein it is heated to a suitably high temperature, e.g. 675° F., and introduced through line 38 into tar separator 43 operating under vacuum, e.g. 70 mm. Hg absolute, wherein vapors are separated from a residue and passed through line 40 into the fractionating column at a level above plate 16. Since the oil returned through line 40 has high heat content as indicated previously, the result is to increase the vapor and liquid loadings between plate 16 and plate 24 over those that would be obtained in the absence of such introduction.

The oil returned through line 40 is preferably introduced into the tower at a level sufficiently low that the oil is contacted with alkaline material in zone 14 in order that the alkaline material may react with constituents of the returned oil which would produce poor color stability in the distillate products if allowed to become incorporated therein.

The residue from tar separator 43 may constitute for example about 20% of the material introduced through line 38. This residue can be introduced into flash zone 11 through line 44 if desired.

In the process of the invention, the heated condensate introduced into the column is generally either partially or entirely in vapor phase. The distillate, prior to its introduction into the distillation system can, however, be substantially entirely in liquid phase by virtue of being under sufficient pressure to prevent substantial vaporization.

In the process illustrated by the drawing, the removal of heat is preferably effected by means, such as cooler 32, additional to the means, not shown, for providing normal reflux at the top of the column by return of condensate produced in an external condenser.

According to the invention, the heated material is introduced onto a plate in the fractionating column, and this plate is generally one which is not more than four plates beneath the plate from which the liquid material is removed prior to heating; i.e. generally, there are not more than three plates below the plate of removal and above the plate of introduction. In the case where there are less than four plates in the fractionating column beneath the plate of removal, the maximum number of plates between the plate of removal and the plate of introduction will be correspondingly reduced. As previously mentioned, the plate of introduction can be the same as the plate of removal, or it can be a plate above the plate of removal. The latter instance may be advantageous in that it provides a smaller area in which there is increased vapor loading than in the other cases. Preferably, however, there are not more than three plates below the plate of introduction and above the plate of removal.

The invention claimed is:

1. Method for distilling which comprises: vaporizing a distillation charge; passing evolved vapors upwardly through a fractionating column; removing condensate from a plate therein; heating the removed condensate to increase its heat content above that of such condensate within the column; introducing thus the heated material onto a plate in the column above the first-named plate; and removing heat from the column at a level above the level of such introducing, thereby to increase the rate of liquid flow between the level of heat removal and said first-named plate.

2. Method according to claim 1 wherein substantially all of the heated material is introduced into the column.

3. Method according to claim 1 wherein the distillation charge is a petroleum material containing acidic constituents, and the column has a treating zone in a lower portion thereof containing a liquid mixture of condensate and an alkaline treating agent.

4. Method according to claim 3 wherein at least a portion of said mixture is removed from the treating zone, and wherein petroleum is recovered from the removed mixture, heated and introduced into the column.

5. Method for distilling which comprises: vaporizing a distillation charge; passing evolved vapors upwardly through a fractionating column; in response to an insufficient liquid level on a first plate in said column, removing condensate from a plate at least as low in said column as said first plate; heating the removed condensate to increase its heat content above that of such condensate in the column; introducing thus heated material onto a plate in said column above the plate from which the condensate was removed; and removing heat from said column at a level above the level of said introducing, thereby to increase the liquid level on the plates, including said first plate, between the level of removing said condensate and the level of removing said heat.

References Cited in the file of this patent

UNITED STATES PATENTS

| | | | |
|---|---|---|---|
| 1,418,885 | Schulze | June 6, | 1922 |
| 1,744,421 | Stroud et al. | Jan. 21, | 1930 |
| 1,756,156 | Herthel et al. | Apr. 29, | 1930 |
| 2,067,627 | Fenske et al. | Jan. 12, | 1937 |
| 2,237,271 | Dunham | Apr. 1, | 1941 |
| 2,321,540 | Atwood | June 8, | 1943 |
| 2,357,113 | Houghland et al. | Aug. 29, | 1944 |
| 2,455,679 | Jones et al. | Dec. 7, | 1948 |
| 2,646,392 | Gerhold | July 21, | 1953 |
| 2,658,027 | Hoover | Nov. 3, | 1953 |
| 2,698,282 | Findlay | Dec. 18, | 1954 |